J. SCHREIBER.
TRUCK.
APPLICATION FILED MAR. 24, 1908.

920,496.

Patented May 4, 1909.

Witnesses:
C. W. Benjamin
Marie J. Wainright

Inventor
John Schreiber
By his Attorney
T. F. Bourne

THE NORRIS PETERS CO., WASHINGTON, D. C.

UNITED STATES PATENT OFFICE.

JOHN SCHREIBER, OF JERSEY CITY, NEW JERSEY.

TRUCK.

No. 920,496.  Specification of Letters Patent.  Patented May 4, 1909.

Application filed March 24, 1908. Serial No. 422,941.

*To all whom it may concern:*

Be it known that I, JOHN SCHREIBER, a citizen of the United States, and resident of Jersey City, in the county of Hudson and State of New Jersey, have invented certain new and useful Improvements in Trucks, of which the following is a specification.

In ordinary trucks of box-like form the capacity of the truck is limited to the space therein adapted to contain articles, so that if a lot or order of goods, of greater quantity than a given truck will hold, is to be moved from a place of storage to the place for packing them in crates, boxes or the like, the balance of the goods of such lot or order has to be placed in another truck, and so on, thereby entailing the use of an increased number of trucks and the consequent expense and space required for such trucks.

The object of my invention is to provide a truck of substantially box-like form, whose holding capacity may be increased to receive a greater quantity of goods than when the truck is adjusted to its normal or smaller capacity, whereby a smaller number of trucks of given size may be utilized to transport a greater quantity of goods than with the ordinary box-like trucks.

In carrying out my invention I provide a truck having a bottom and sides, with ends movably or pivotally connected with said bottom, said ends having inwardly projecting webs forming substantial extensions of the sides, when the ends are opened outwardly, and means to hold said ends firmly in different open positions, and by preference I provide the sides with shields or pockets to receive the webs on the ends to prevent them from interfering with the contents of the truck.

My invention also comprises novel details of improvement and combinations of parts that will be more fully hereinafter set forth and then pointed out in the claims.

Figure 1:
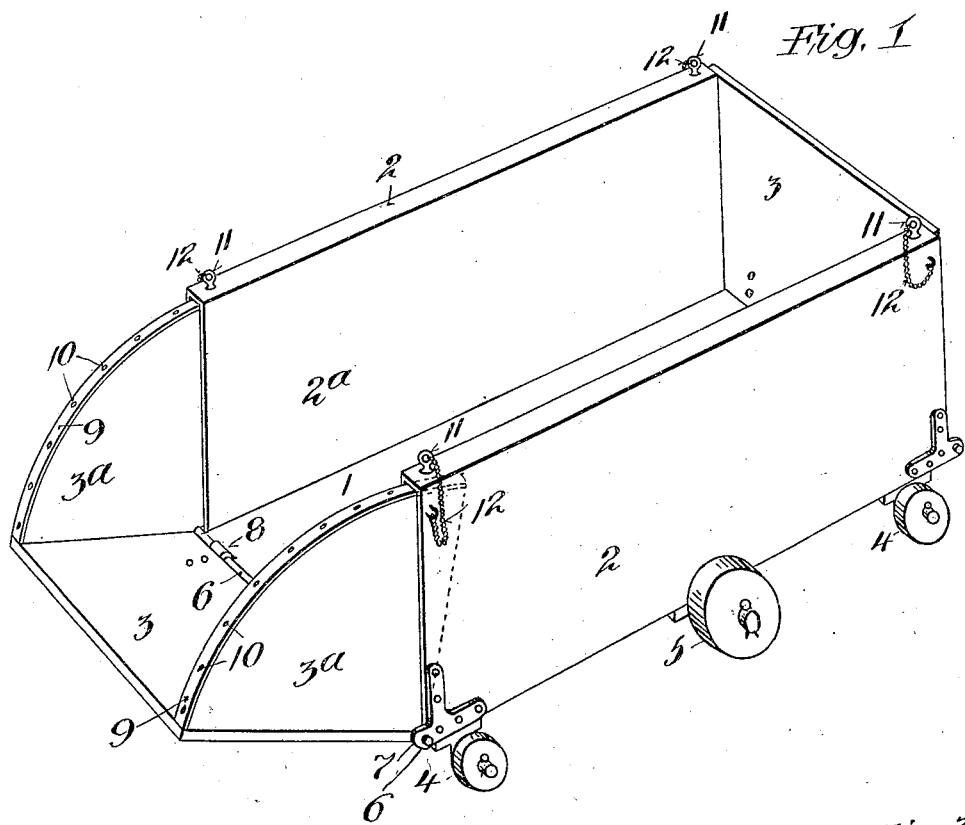
Figures 2, 3:
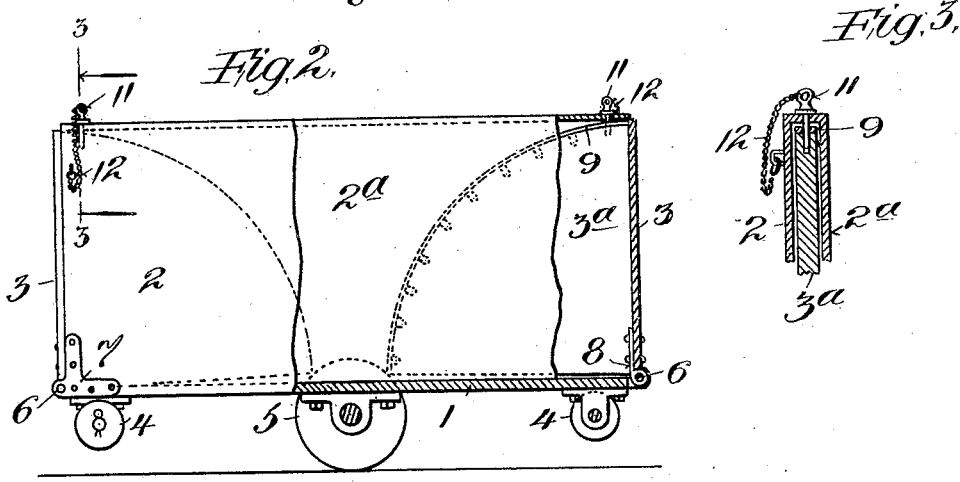

Reference is to be had to the accompanying drawings forming part hereof, wherein, Figure 1 is a perspective view of a truck embodying my invention, one of the ends being opened out, Fig. 2 is a side view of the truck partly broken away, and Fig. 3 is a detail section, enlarged, on the line 3, 3, in Fig. 2.

Similar numerals of reference indicate corresponding parts in the several views.

The main body portion of the truck comprises a suitable bottom 1, sides 2 rising therefrom, and movable ends 3, shown hinged to the end portions of bottom 1 so as to form, when closed, a box-like receptacle having an open top, suitable rollers or trucks 4, 5, being secured to the truck in any well known manner. I have shown the ends 3 hinged to the bottom by means of rods 6 passing through holes in brackets 7 and receiving the eyes of hinge plates 8, riveted or otherwise fastened to the ends 3. The ends 3 at their edges have inwardly projecting webs $3^a$ suitably secured to the ends, and shown having their upper edges curved, which webs are located substantially parallel with the sides 2, so that when opened out said ends 3 in conjunction with the webs $3^a$ will increase the capacity of the truck to a corresponding extent, as the webs $3^a$ form substantial continuations of the sides 2. Means are provided for holding the ends 3 opened out more or less, and for this purpose I have shown the webs $3^a$ provided with strips 9 provided with holes 10 to receive pins 11 that pass through holes in sides 2 to firmly and detachably secure the webs $3^a$ to the sides 2, whereby the ends 3 may be held firmly in the desired positions. Flexible connections 12 may be attached to the pins 11 and connected with the sides 2 to retain said pins in location for use.

In order that the webs $3^a$ will not interfere with or injure the contents of the truck as said webs are swung back and forth, I provide shields or pockets to receive said webs, which shields or pockets may be formed between the sides 2 and walls or plates $2^a$, between which the webs $3^a$ are located and may freely travel, or said pockets may be formed in any other suitable manner.

With a truck constructed in accordance with my improvements the same may be used closed, as in Fig. 2, in the ordinary manner and stored in that condition so as not to take up extra space. If the required contents of the box exceed its capacity when closed, one or both of its ends may be opened out to any desired extent, as shown in Fig. 1, to increase the capacity of the truck and the ends may be held in such position by the pins 11, all whereby the same truck may receive more or less goods as may be required. By this means charging of trucks with goods to be taken from a storage place for packing is facilitated, the number of trucks required for a given amount of work may be decreased, and smaller trucks used to the same relative extent, because of their capacity to receive more goods when required than they permit when the ends are closed.

Changes may be made in the details of construction shown and described, within the scope of the appended claims, without departing from the spirit of my invention.

Having now described my invention what I claim is:

1. A truck comprising a bottom and sides, and ends hinged thereto and provided with webs extending along said sides, the said sides being provided with pockets opening at the ends thereof receiving the corresponding webs to protect them from engagement with the contents of the truck.

2. A truck comprising a bottom, sides provided with double walls forming pockets, ends hinged to said bottom and provided with webs adapted to move back and forth within the corresponding pockets, and means for securing said ends and their webs in positions of adjustment.

Signed at New York city, in the county of New York, and State of New York, this 21st day of March, A. D. 1908.

JOHN SCHREIBER.

Witnesses:
  T. F. BOURNE,
  MARIE F. WAINRIGHT.